Oct. 11, 1966    M. S. ARBONIES    3,278,715
FRICTIONLESS DEVICE FOR MAKING ELECTRICAL
CONTACT BETWEEN MOVING MEMBERS
Filed Feb. 3, 1965    2 Sheets-Sheet 2
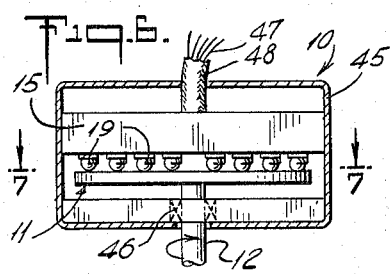
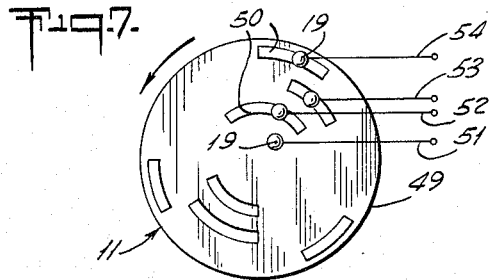
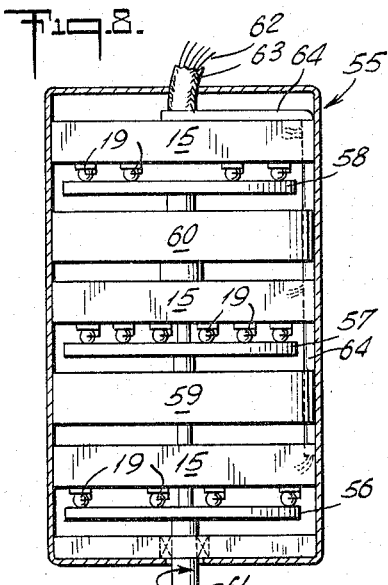
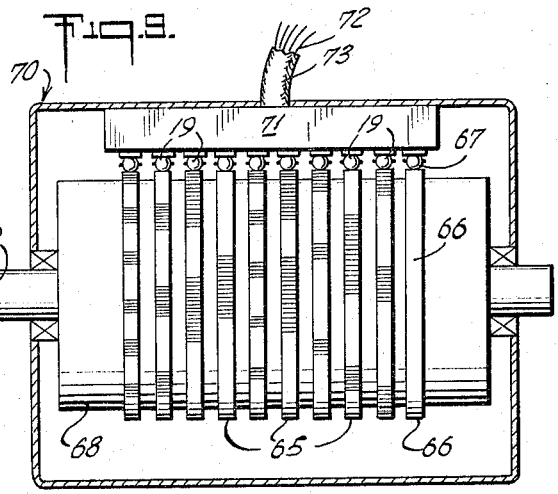
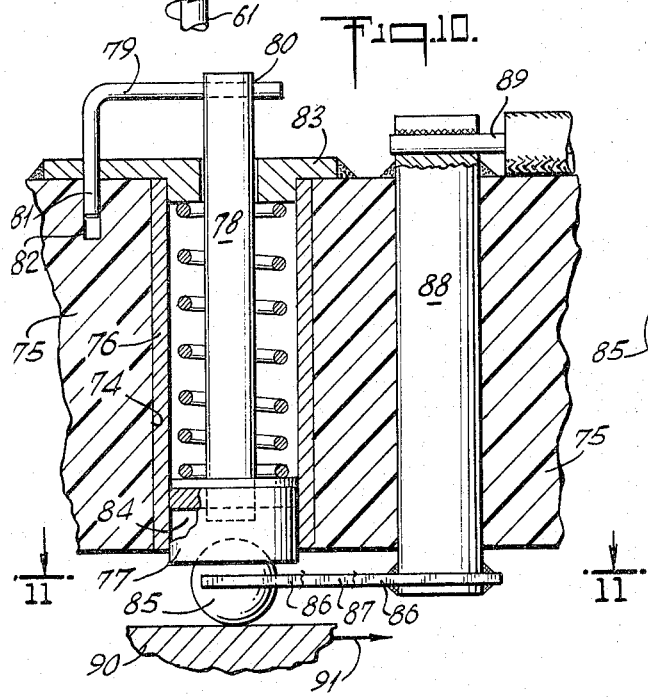
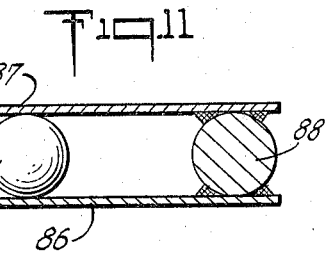
INVENTOR
MARTIN S. ARBONIES
BY
Douglas M. Clarkson
ATTORNEY

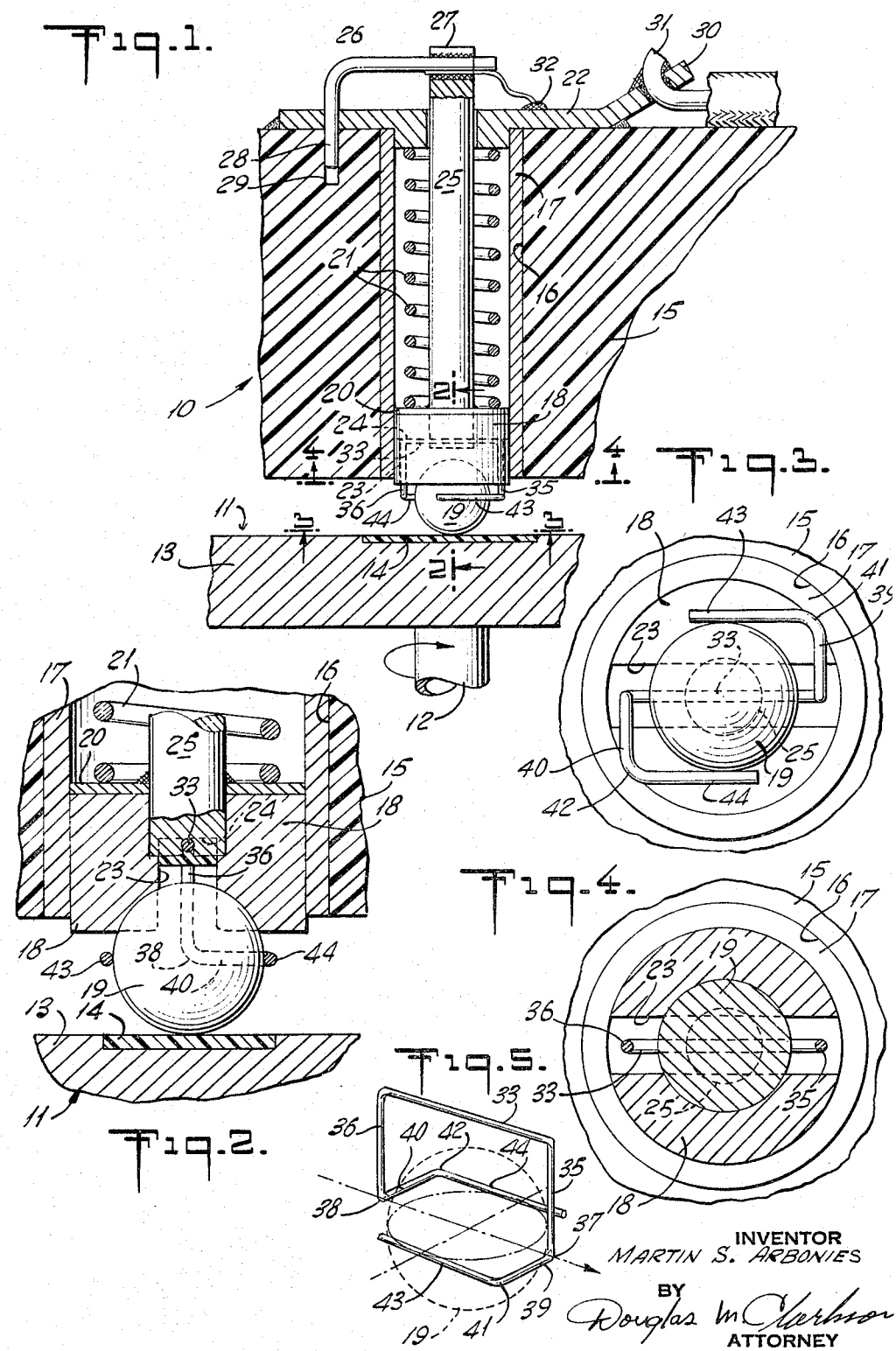

United States Patent Office 3,278,715
Patented Oct. 11, 1966

3,278,715
FRICTIONLESS DEVICE FOR MAKING ELECTRICAL CONTACT BETWEEN MOVING MEMBERS
Martin S. Arbonies, 5 Rochester Court, Huntington, N.Y.
Filed Feb. 3, 1965, Ser. No. 430,149
9 Claims. (Cl. 200—166)

This invention, generally, relates to function encoder mechanisms and, more particularly, to an improved shaft type, absolute position encoder.

Encoders of the common shaft type are in ever increasing use today where digital readout is desired. Such encoder mechanisms are used widely in large numbers in industry in connection with various types of instruments, control systems, automated machine tool devices, and other equipment. The list of uses for encoder mechanisms both present and potential is endless, and the search for a better shaft-position encoder mechanism also is endless.

It has been stated that the "ideal" shaft encoder would have the following properties:

(1) very long life
(2) absolute shaft-position indication
(3) no electrical contact noise
(4) low torque
(5) low moment of inertia
(6) high reliability.

An analysis of the encoder principles that are presently in use would reveal that no encoder has all of these ideal characteristics. All present day encoders obtain one characteristic at the expense of others.

Encoder principles

*Multi-brush encoders.*—Multi-brush encoders probably are the most common type in use today because of their economy. They use printed circuit discs having concentric tracks, one track for each binary digit to be generated.

Electrical noise is a serious problem with these encoders because the code is generated at the points of contact of sliding brushes, and one or more brushes are required for each bit in addition to a common input brush. The many sliding brushes also result in high torque for the prime mover power source.

*Incremental encoders.*—Using various sensing techniques, incremental encoders suffer from the problem of cumulative errors if each count is not registered correctly. If this occurs, it can be corrected only by turning the encoder shaft to a known reference and beginning the count again. The incremental encoder eliminates the multi-brush problems but at the cost of absolute position encoding.

*Magnetic encoders.*—Magnetic encoders were developed to overcome the disadvantages of brushes by using magnetic inductive sensors instead of brushes. They are good for extremely high speed applications, but their resolution is relatively poor. Also, the moment of inertia is high due to the rotating disc, and the cost is higher than that of brush types.

*Optical encoders.*—These encoders use optical techniques to eliminate brush problems and retain absolute position encoding. They have the advantage of extremely high resolution, but the lamp temperature and the humidity limit reliability. The moment of inertia is high due to the rotating disc, and the cost is high also.

*Brush-electrical encoders.*—A combination of brush encoder and electrical circuits has been proposed to overcome some of the disadvantages of the brush type encoders. This is accomplished by using the output of the brush type encoder to actuate successive flip-flop circuits, in turn, provide the output signal, and these output signals are free from electrical noises developed in the brush encoders. However, such encoders obviously are excessively expensive due to the provision of extra electronics, require additional power, and the signals from the brushes must not manifest interruptions in excess of an established time interval to avoid ambiguous output by the processing circuits.

Objects of present invention

It is a principal object of the present invention to provide a new and improved function encoder mechanism in which all of the properties enumerated above obtain.

A further object of the invention is to provide a function encoder mechanism having new and improved means to increase operation life, decrease torque and reduce electrical contact noise to a minimum and increase reliability and accuracy throughout operational life.

A still further object of the invention is to provide an encoder mechanism having a new and improved electrical brush device.

Another object of the invention is to prove an electrical contact device for conducting electrical signals between two relatively moving members wherein wear is reduced to a minimum.

The invention briefly

A function encoder mechanism constructed in accordance with the principles of the present invention is adapted for providing increment and reference intelligence, preferably in the form of electrical pulse signals, and includes means to define intelligence corresponding to a preselected function which varies in accordance with a desired condition. Spherical means is positioned in rolling mechanical engagement with the intelligence-defining means for providing increment and reference signals to an output terminal. An electrical contact means is positioned intermediate to the spherical means and the output terminal and includes a conductive element in electrical contact with the spherical means at a point tangent to the axis of rotation of the spherical means. Suitable means is provided to cause relative movement between intelligence-defining means and the spherical means.

The above and other objects and advantages of the invention will be understood better from the following detailed description of a presently preferred embodiment taken in conjunction with the accompanying drawings, in which:

FIG. 1 is a view in side elevation, partly in section, greatly enlarged, of a brush contact device in accordance with the principles of the present invention, FIG. 2 is a view taken along the line 2—2 in FIG. 1,
FIG. 3 is a view taken along the line 3—3 in FIG. 1,
FIG. 4 is a view taken along the line 4—4 in FIG. 1,
FIG. 5 is a view in perspective of an electrical contact means shown in conjunction with the spherical means in FIGS. 1 and 2, FIG. 6 is a view partly in section of a single stage function encoder mechanism constructed in accordance with the principles of the present invention, FIG. 7 is a view taken along the line 7—7 in FIG. 6, FIG. 8 is a multi-stage function encoder mechanism, FIG. 9 is another form of a function encoder mechanism, FIG. 10 is a modified form of the present invention, and FIG. 11 is a view taken along the line 11—11 in FIG. 10.

*Inventive principle*

The basic principle underlying the present invention is the provision of an electrical encoder wherein the contact between two relatively moving members provides substantially zero relative motion. This will be referred to hereinafter as the "zero" relative motion principle.

The encoder with which the present invention relates has been termed variously a brush type encoder or in analogue-to-digital converter. It provides, broadly, a means for obtaining mechanical, angular displacement or, in other words, shaft rotational position indications. Such encoders develop codes in binary form or in forms which are modifications of a binary code. The same principles of "zero" relative motion would also apply to linear encoders, thus using the same electrical contact as used in the rotatary configuration with only the embodiment for positioning the coded member relative to the brush block being modified.

Electrical encoders, which have been in use for many, many years, of the brush type have relied upon merely sliding contacts between the moving members. However, sliding contacts wear, which results in a decrease in accuracy since the contact surface increases in area during use. Wear particles distributed along the track also affect the quality of electrical contact, progressively degrading with usage. Lubrication has been attempted, but this creates problems in cold temperature, as well as polymerization at normal temperatures. Both of these conditions degrade the electrical contact sufficiently to cause electrical "noise."

In accordance with the present invention, a spherical member, such as a ball, is positioned to roll on the surface of the coded disc, thereby creating no instantaneous movement, or relative movement, with respect to the surface contacted on the coded disc. To obtain the electrical current developed in the spherical member, an output lead is necessary, and this is positioned at the pole, or center of the axis of rotation, of the spherical member.

To reduce the relative movement between the ball and the coded disc, it is necessary that the ball rotate substantially one hundred percent of the time. To achieve continuous rotation of the ball, it is necessary to provide a very particular mechanical advantage and low friction in which the ball is seated.

*Presently preferred form*

Referring now to FIG. 1 of the drawings, a portion of an encoder is identified by the reference numeral 10 and is shown more completely by the same reference numeral 10 in FIG. 6. A rotatable disc 11 of a predetermined diameter is formed of a suitable, electrically-conductive material and is rotatable by any suitable means, such as a shaft 12 to which may be connected a suitable prime mover, such as an electrical motor, a recorder mechanism, etc.

The upper surface 13 of the electrically-conducted disc 11 is interrupted periodically by segments, such as identified by the reference numeral 14, of insulation material. These insulation segments are arranged in a predetermined pattern about the surface 13 of the disc 11 to develop a predetermined code. Such segments are illustrated in FIG. 7, for example.

Positioned adjacent the rotating disc 11 and spaced slightly therefrom is a stationary brush block 15 for supporting a plurality of brushes, one of which is illustrated in FIG. 1. The brush block 15 is formed of a suitable electrical insulation material and has drilled at predetermined locations therein a series of holes, such as indicated by the reference numeral 16. Each such hole 16 is provided with an insert 17 formed of a suitable electrically conductive material, such as brass.

Positioned slidably within the lower end of the insert 17 is a piston-like member 18 which will be referred to hereinafter as a "pusher" for a spherical member, such as a ball 19. A washer 20 is slidable within the insert 17 and is positioned adjacent the upper surface of the pusher 18 and against which a spring 21 acts at one end and at the other end against a cap 22.

The pusher 18 is formed of any suitable material such as stainless steel, for example. However, it has also been contemplated that it either may be formed entirely of a high temperature ceramic or plastic, or it may have the ball-contacting surface portion only formed of this material.

To reduce the friction between the pusher 18 and the ball 19 and also to generate a driving force for the direction of rotation of the ball 19, a slot 23, shown in FIGS. 2 and 3 particularly, is formed upwardly from the bottom of the pusher 18 to a point indicated by the dotted line 24.

A rod 25 is positioned axially within the insert 17 and, passing through the pusher 18, is soldered a washer 20, and passes freely through an opening in the cap 22. The uppermost end of the rod 25 as viewed in FIG. 1 is formed with a slot 27 to receive one end of a bent wire 26, the outer end 28 of the bent wire 26 being freely slidably within an aperture 29. The bent wire 26 serves the purpose of preventing the rod 25 from pivoting, and therefore, maintains the slot 23 in the pusher 18 always in the direction of movement of rotation for the ball 19.

The cap 22 is formed of a suitable electrically conducted material and has one end 30 bent upwardly to receive an electrical terminal 31 for providing an output connection. To ensure good electrical contact between the rod 25 and the terminal 31, a small electrical wire is affixed, such as by soldering or welding, within the slot 27 at one end and to the cap 22 at the other end as at the point 32 in FIG. 1.

The lowermost end of the rod 25, as viewed in FIG. 1, is slotted to receive the horizontal portion 33 of a wire cage contact element, as seen more completely in FIG. 5 of the drawings. The horizontal portion 33 of this contact element is maintained within good electrically conductive contact with the rod 25 by any suitable means, such as welding, soldering or by the addition of a suitable epoxy adhesive material 34, which hardens and forms a support member as better seen in FIG. 2 of the drawings.

This wire cage conductive element has two legs 35 and 36 bent from the portion 33 to points 37 and 38, respectively, at which points the wire is bent at substantially right angles to form the segments 39 and 40, respectively. However, the wire is bent again at points 41 and 42, respectively, to provide two contacting legs 43 and 44, respectively. It is the leg 43 which is visible in FIG. 1, and these two contacting legs 43 and 44 are also seen in FIGS. 2 and 3.

It is important that the contacting legs 43 and 44 contact the ball 19 tangent to the ball at the diameter of the axis of rotation and perpendicular to and across the axis of rotation of the ball. The particular configuration depicted in the drawings is uniquely adapted to accomplish this function. While the legs 43 and 44 are illustrated in the drawings as being circular, from a practical viewpoint it may be more desirable to have the sides which contact the ball 19 somewhat flattened, thereby reducing the degree of criticality as to the point of tangency for contact between these legs 43 and 44 and the ball 19.

Referring now to FIG. 6 of the drawings, an encoder 10 is shown encased within a suitable housing 45 with the shaft 12 extending therefrom and journaled in suitable bearings 46 so that it is rotatable readily. Electrical leads 47 encased in a suitable cable 48 extends from the housing 45 at any convenient location, such as the top.

FIG. 7 shows a view of the coded segmented disc 11 looking down as viewed in FIG. 6. Usually, it is the customary practice to form the disc 11, that portion indicated by the numeral 49, of a suitable electrically conductive material and the segments, of which the ones identified by the numeral 50 are typical, being formed of a suitable non-conductive material. The output terminals 51, 52, 53 and 54 are the electrical output terminals for respective roller brushes of the form indicated in FIG. 1 and may be connected as indicated by the numeral 30 and 31 in FIG. 1. Of course, the code which is presented at the terminals 51–54 may be any that is desired, such as for example, a one, two, four, eight code or a one, two, two, four code.

FIG. 8 of the drawings illustrates a somewhat larger housing 55 for enclosing a plurality of coded discs to form a specialized function. For example, the lowermost disc 56 may have a total of seven tracks and associated roller brushes plus a common roller brush, the disc 57 having six plus a common, and the disc 58 having five plus a common. Suitable gear trains 59 and 60 may interconnect respective stages of the discs with a single shaft 61 connected to a suitable prime mover (not shown). Output leads 62 are formed in a suitable cable 63 and connected to the various roller brushes through a cable 64 running along the inside wall of the housing 55.

FIG. 9 shows a modification of the housing shown in FIG. 8 wherein a plurality of dics 65 are formed of electrically conductive material with segments of insulation material interrupting the perimeters or rims at predetermined locations to develop a desired code. The disc 66, however, has no non-conductive segments since this disc with the particular brush contact 67 forms the common terminal for all of the discs 65.

The discs 65 and the common disc 66 are supported on a suitable drum 68 for rotation with a shaft 69 in suitable bearings within a housing 70. The brush block indicated by the numeral 71 is formed adjacent the inside wall of the housing 70 so that its output leads 72 may be encased in a suitable cable 73 as illustrated by way of example.

FIG. 10 illustrates a modified form of roller brush-holder which incorporates the principles of the present invention. A hole 74 is formed in a non-conductive block 75 in a precisely predetermined location, and a brass insert 76 is fitted within the hole 74. A pusher 77 is slidably located within the insert 76 and soldered, or otherwise fixedly attached, to the lower end of a rod 78.

The upper end of the rod 78 has an L-shaped wire 79 fitted within a slot, indicated by the numeral 80, as by welding, for example, the end 81 being bent downwardly to be received loosely within a hole 82 for vertical movement in the order of five to six thousandths of an inch. The hole 82 is formed in a cap 83 fixedly attached across the upper opening of the sleeve 76. The purpose of the wire 79, like the wire 26 in FIG. 1, is to maintain the bar 78 in a preset rotational position.

The pusher 77 is formed with a slot 84 in the direction of movement of a ball 85, similar to that shown in FIG. 1. By way of illustration only, the ball 85 may be in the order of .048" in diameter.

Electrical contact is made from the ball 85 by two arms 86 and 87, FIG. 11. The arms 86 and 87 are an integral part of a conductive bar 88, suitably positioned, extending upwardly through the brush block 75 for soldering to an output wire lead 89, FIG. 10.

It is important that each of the arms 86 and 87 contact the ball 85 tangent at the axis of rotation of the ball. Thereby, the relative movement between each of the arms 86 and 87 and the ball 85 is a minimum.

A disc 90 in FIG. 10 is similar to those already described and may have a movement as indicated by an arrow 91.

It will be understood that the above description is by way of illustration only and that the invention may be modified variously within the scope of the appended claims which are intended to define the invention.

What is claimed is:
1. A function encoder mechanism for providing increment and reference intelligence comprising:
   means to define intelligence corresponding to a preselected function which varies in accordance with a condition,
   spherical means in rolling mechanical engagement with said first-mentioned means for providing increment and reference signals to an outpu tterminal,
   said output terminal and said first-mentioned means being positioned separately so that there may be relative movement therebetween,
   electrical contact means intermediate said spherical means and said output terminal including a conductive element in mechanical engagement for the purpose of maintaining a continuous electrical contact with said spherical means at a point tangent to the axis of rotation of said spherical means, and
   means providing minimum relative movement between said first-mentioned means and said spherical means.

2. A function encoder mechanism for providing increment and reference intelligence comprising:
   means to define intelligence corresponding to a preselected function which varies in accordance with a condition,
   spherical means in rolling mechanical engagement with said first-mentioned means for providing increment and reference signals to an output terminal,
   output terminal means separate from said first-mentioned means,
   electrical contact means extending from said output terminal means and having a portion in engagement with said spherical means at a point of minimum motion, and
   means providing minimum relative movement between said first-mentioned means and said spherical means.

3. A function encoder mechanism for providing increment and reference intelligence comprising:
   a first member having an aperture opening externally from the member at one end,
   a second member positoned adjacent said first member and including means to cause relative movement therebetween,
   spherical means positioned to have rolling contact with said second member and including seating means to receive at least a portion of said spherical means,
   said second member including means to define intelligence corresponding to a preselected function which varies in accordance with a condition, and
   electrical contact means extending from said first member and having a portion in engagement with said spherical means at a point of minimum motion.

4. A function encoder mechanism as set forth in claim 3 in which said seating means has a slot extending therethrough to reduce the area of contact with said spherical means.

5. A function encoder mechanism as set forth in claim 3 including spring means to bias said seating means toward said second member with a predetermined force.

6. A function encoder mechanism as set forth in claim 3 wherein said electrical contact means includes an electrically conductive wire bent to contact said spherical means at a point tangent to its axis of rotation.

7. A function encoder mechanism as set forth in claim 3 wherein said electrical contact means includes electrically conductive arm means in engagement with said spherical means at a point tangent to its axis of rotation.

8. A function encoder mechanism as set forth in claim 3 including output terminal means positoned on said first member, and an electrically conductive member extending from said electrical contact means to said output terminal means.

9. An antifriction contact for providing electrical contact between two relatively moving members, comprising:

a first member having an aperture opening externally from the member at one end, means defining a spherically concave surface fitted slidably within said aperture opening, a second member positioned adjacent said first member and including means to cause relative movement therebetween, a spherical means of electrically conductive material seated within said concave surface and in rolling engagement with said second member, and electrical contact means extending from said first member and having a portion in engagement with said spherical means at a point of minimum motion.

References Cited by the Examiner

UNITED STATES PATENTS

| | | | |
|---|---|---|---|
| 2,201,881 | 5/1940 | Bryant et al. | 200—8 |
| 3,024,334 | 3/1962 | Rhodes | 200—166 |
| 3,184,559 | 5/1965 | Oxley | 200—8 X |

ROBERT K. SCHAEFER, *Primary Examiner.*

H. O. JONES, *Assistant Examiner.*